US007328205B1

(12) United States Patent
Dunham et al.

(10) Patent No.: US 7,328,205 B1
(45) Date of Patent: Feb. 5, 2008

(54) SYSTEM AND METHOD FOR AUTOMATING AN UNBILLABLE STUDY

(75) Inventors: Kathryn S. Dunham, Jacksonville, FL (US); Edward Kennedy Majewski, Hoover, AL (US); Bettye A. Shratter, Birmingham, AL (US); Frances G. George, Pleasant Grove, AL (US); Margaret M. Comans, Columbiana, AL (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 491 days.

(21) Appl. No.: 10/153,529

(22) Filed: May 22, 2002

(51) Int. Cl.
*G06F 17/30* (2006.01)

(52) U.S. Cl. .............................. 707/3; 707/10; 705/34

(58) Field of Classification Search .................. 707/10, 707/3, 102, 100, 1, 104.1, 2, 4; 705/30, 32, 705/34, 40; 715/503
See application file for complete search history.

(56) References Cited

U.S. PATENT DOCUMENTS 5,287,270 A * 2/1994 Hardy et al. .................. 705/34
5,852,812 A * 12/1998 Reeder ........................ 705/39
5,978,780 A * 11/1999 Watson ........................ 705/40
6,032,132 A * 2/2000 Nelson ........................ 705/34
6,256,515 B1 * 7/2001 Cox et al. .................... 455/565
6,493,685 B1 * 12/2002 Ensel et al. .................. 705/40
6,714,979 B1 * 3/2004 Brandt et al. ............... 709/225
6,725,229 B2 * 4/2004 Majewski et al. .......... 707/102
6,782,388 B2 * 8/2004 Majewski et al. ............ 707/10
2002/0188562 A1 * 12/2002 Igarashi et al. ............... 705/40

OTHER PUBLICATIONS

Powers et al., Flexible Billing Tools Meet Customer Demands, Computer Applications in Power, IEEE, vol. 11, Issue 1, Jan. 1998, pp. 54-58, Digital Object Identifier 10.1109/67.648502.*

* cited by examiner

*Primary Examiner*—Greta L Robinson
(74) *Attorney, Agent, or Firm*—David W. Lynch; Merchant & Gould

(57) ABSTRACT

A system and method for automating an unbillable study are disclosed. Account information relating to an unbillable call is received from an unbillable study database. At least one database is searched to retrieve records corresponding to the account information. A single report comprising records retrieved from all of the searched databases is generated. The report may be stored in a query-able database.

15 Claims, 4 Drawing Sheets

Fig. 2A

BELLSOUTH ERROR CODES
SORTED BY BELLSOUTH ERROR CODE

| | | |
|---|---|---|
| 5H | INDEPENDENT CO. UNBILLABLE/UNCOLLECTIBLE FROM NPA | 42 |
| 5I | INVALID VERTICAL/HORIZONTAL COORDINATES | 10 |
| 5J | INVALID MESSAGE TYPE FOR 976 SERVICE | 10 |
| 5K | INVALID RERATE RECEIVED COLLECT MESSAGE | 10 |
| 5L | INVALID NXX ON WATS MESSAGE | 42 |
| 5M | INVALID LATA | 62 |
| 5N | PLANT TEST NUMBERS | 10 |
| 5O | INTERLATA USAGE THAT HAS NO CARRIER ID | 10 |
| 5P | RERATE FOR INTEREXCHANGE CARRIER | 10 |
| 5Q | NO OFFICIAL GUIDE | 10 |
| 5R | INVALID CARRIER-ID ON STATION-ID WATS | 72 |
| 5S | OPEN TALK | 72 |
| 5T | INVALID SWAB CODE NUMBER | 42 |
| 5U | INVALID LADT MESSAGE | 10 |
| 5V | INVALID LATA ON TOPS MESSAGE | 10 |
| 5W | INTERLATA UNBILLABLE IXC CALL | 11 |
| 5X | INTRALATA UNBILLABLE IXC CALL | 11 |
| 5Y | IXC ORIGINATING NUMBER NOT ON THE TPM | 42 |
| 5Z | IXC TERMINATING NUMBER NOT ON THE TPM | 44 |
| 60 | CHARGE DOES NOT EQUAL QUOTED CHARGE | 45 |
| 61 | CHARGE DOES NOT EQUAL OSPS RATER CHARGE | 45 |
| 62 | INVALID PART CHARGE MESSAGE | 45 |
| 63 | V & H DIFFERENCE COULD NOT BE CALCULATED | 10 |
| 64 | INVALID MILEAGE | 10 |
| 65 | INVALID RAO | 64 |
| 65 | INVALID RAO | 64 |
| 66 | INVALID CONNECT TIME AND/OR LENGTH OF CONVERSATION | 61 |
| 67 | INVALID V-H DIFFERENCE | 10 |
| 68 | INVALID SETTLEMENT CODE FOR RADIO LINK CHARGE | 71 |
| 69 | A FUTURE MESSAGE DATE | 41 |
| 6A | NO CENTRAL OFFICE (C.O.) LEAD | 10 |
| 6B | V & H DIFFERENCE COULD NOT BE CALCULATED | 02 |
| 6C | WATS ON NON-WATS | 10 |
| 6D | COIN ON NON-COIN | 10 |
| 6E | NON-COIN PAID MESSAGE ON A COIN GUIDE | 08 |
| 6F | INDEPENDENT COMPANY CENTRAL OFFICE LEAD TELEGRAM | 10 |
| 6G | INVALID CUSTOMER CODE ON A FINAL ACCOUNT | 10 |
| 6H | INDEPENDENT COMPANY NON-BOC/NON-AT&T MESSAGES | 11 |
| 6I | COIN NON-SENT PAID MESSAGE HAS A NON-COIN GUIDE | 10 |
| 6J | HOTEL NON-SENT PAID | 10 |
| 6K | HOTEL/COIN INDICATOR NOT SET | 09 |
| 6L | NO MESSAGE PROCESSING GUIDE | 10 |
| 6M | DATED AFTER DISCONNECT | 06 |
| 6N | DATED AFTER NUMBER CHANGE | 06 |
| 6O | NOT AFTER DISCONNECT/NUMBER CHANGE | 06 |
| 6P | CHARGE FIELD NOT NUMERIC OR ZERO IN RATED MESSAGE | 45 |
| 6Q | FROM STATE INVALID | 67 |
| 6R | NO TARIFF FOUND | 10 |
| 6S | TARIFF DATE INVALID | 10 |

Fig. 2B

BELLSOUTH ERROR CODES
SORTED BY BELLSOUTH ERROR CODE

| | | |
|---|---|---|
| 6T | DUPLICATE MESSAGE | 80 |
| 6U | INVALID OTHER LINE CHARGE | 48 |
| 6V | INVALID RECORD TYPE | 40 |
| 6W | OUT-OF-BAND WATS | 10 |
| 6X | V & H DIFFERENCE EQUAL ZERO | 02 |
| 6Y | DELAYED DIRECTORY ASSISTANCE(DA) SENT PAID MESSAGE | 10 |
| 6Z | CALLING CARD ON NON-CALLING CARD GUIDE | 01 |
| 70 | DUPLICATE MESSAGE | 80 |
| 71 | NO CENTRAL OFFICE (C.O.) LEAD | 71 |
| 72 | MSG DATED AFTER DISCONNECT GUIDE DATE | 06 |
| 73 | RECORD TYPE INVALID | 40 |
| 74 | MESSAGE MATCHED TYPE 9 CREDIT | 10 |
| 75 | MORE THAN EIGHTEEN GUIDES | 10 |
| 76 | OPTIONAL CALLING PLAN (OCP) ON BILL DAY | 10 |
| 78 | INVALID COIN CREDIT REQUEST | 10 |
| 79 | SERVICE OBSERVE | 10 |
| 7A | NO COIN CENTRAL OFFICE HEADER | 10 |
| 7C | NO COIN ACCOUNT HEADER | 10 |
| 7D | FINAL COIN MESSAGE | 10 |
| 7F | COIN MESSAGE DATE BEFORE CONNECT DATE | 05 |
| 7G | COIN TYPE 9 CREDIT REMOVAL | 10 |
| 7H | INVALID BILL-TO-CUSTOMER-CODE (BTCC) | 10 |
| 7I | ACCOUNT INQUIRY RECORDS | 10 |
| 7L | MESSAGE MASTER FILE AUTOLIST (BOC AND ATT) | 10 |
| 7N | NUMERIC FIELD WITH NON-NUMERIC CONTENTS | 10 |
| 7P | LOCAL RECORD WITHOUT A LOCAL GUIDE | 10 |
| 7Q | INVALID CREDIT TYPE | 10 |
| 7T | MESSAGE MATCH HOTEL BILLING INFO SYS TYPE 9 CREDIT | 10 |
| 7U | UNBILLABLE, UNCOLLECTIBLE ON A BELL CENTRAL OFFICE | 10 |
| 7V | MEASURED SERVICE RECORD DATED PRIOR BILLING PERIOD | 41 |
| 7X | BOC/OTHER IXC MESSAGE MASTER FILE AUTOREMOVAL | 10 |
| 7Y | UNBILLABLE, UNCOLLECTIBLE MESSAGE | 10 |
| 7Z | UNBILLABLE, UNCOLLECTIBLE - NOT INDEPENDENT CO. | 10 |
| 81 | COIN PAID MESSAGE FROM COINLESS STATION | 10 |
| 82 | GATEWAY MESSAGE MATCHED POOR TRANSMISSION CREDIT | 10 |
| 83 | OUT TICKET FOREIGN EXCHANGE (FX) MESSAGE | 10 |
| 85 | LOCAL MESSAGE WITH A COIN GUIDE | 10 |
| 86 | COIN MESSAGE WITH A NON-COIN GUIDE TYPE | 10 |
| 87 | MESSAGE MATCHED TO TYPE 9 CREDIT REQUEST | 10 |
| 88 | INVALID CCRS COIN CREDIT RECORD | 10 |
| 89 | DROP RECORDS FOR PROGRAMMATIC EDIT | 10 |
| 8A | EXCESS CALLING CARD USAGE | 10 |
| 8C | INVALID CARRIER ID | 72 |
| 8D | RETURN ERROR CODE | 10 |
| 8F | REACH OUT CANADA OTHER LINE CHARGE ERROR | 48 |
| 8G | MSG BLOCKED BILL DAY DUE TO ENDUSER BILLING BLOCK | BF |
| 8J | IXC DOMESTIC MESSAGE IN TN > 90 DAYS OLD | 41 |
| 8K | IXC INTERNATIONAL MESSAGE IN TN > 120 DAYS OLD | 41 |
| 8L | TOLL MESSAGE WITH AN 800 SERVICE GUIDE | 10 |

SYSTEM AND METHOD FOR AUTOMATING AN UNBILLABLE STUDY

BACKGROUND OF THE INVENTION

1. Field of the Invention

The present invention relates to researching telephone calls that are unbillable due to a service error. More specifically, the invention relates to an automated system and method for searching at least one database to retrieve records corresponding to an unbillable call.

2. Description of the Prior Art

Interexchange carriers (IXC's) and telephone service providers contract with regional bell operating companies (RBOC's) such as, for example, BellSouth Corporation of Atlanta, Ga., for billing of telephone calls that are placed over the local network of an RBOC. Often, calls are unbillable due to an error in the billing records of the call. Common billing errors include errors such as, for example, a date of call after disconnection of service, a call from an invalid state, an invalid carrier identification, and a toll message with an 800 service guide. Studies are performed by the RBOC to determine why a particular call is unbillable. Existing methods for unbillable telephone call research are both complex and time consuming, thereby raising the operating expenses and consuming the resources of telephone service providers. The expenses and resources devoted to unbillable research may be passed on to consumers in the form of higher rates.

Existing methods for unbillable research are lengthy and cumbersome and comprise conducting individual searches of several databases to find records relating to the unbillable call. These unbillable call databases include disparate databases such as, for example, a Correction Online of Usage Errors investigation database (CLUE), a BellSouth Online Customer Record for Inquiry Systems database (BOCRIS), an Interdepartmental Bill Investigative System database (IBIS), an Loop Maintenance Operating System (LMOS) database, and a guide access database (GADB). Existing unbillable research methods do not enable the production of a single report comprising records retrieved from all the searched databases. Furthermore, existing unbillable research methods do not enable the storage of a single report in a query-able database. Storing a single report in a query-able database would enable the report to be quickly and easily searched, thereby reducing the cost and time required to conduct the unbillable research.

Thus, there is a need in the art for an automated system and method for searching all of the RBOC databases for records corresponding to an unbillable call. Furthermore, there is a need for a system and method that generates a single report comprising records retrieved from all databases, and stores the report in a query-able database.

SUMMARY OF THE INVENTION

The present invention is a system and method for automating an unbillable study. When a call is unbillable due to a service error, a telephone service provider stores account information corresponding to the call in an electronic file such as, for example, a spreadsheet file. The account information may comprise information such as, for example, an account number, a site code, and a code identifying the type of error. Data from the electronic file is imported into an unbillable study database maintained by an RBOC. Information corresponding to an account is then received from the unbillable study database. At least one database is searched to retrieve records corresponding to the account information. A single report of the retrieved records from all of the searched databases is generated. The report may be either printed or viewed on a screen attached to a personal computer. The report may be stored in a query-able database, thereby enabling the report to be quickly and easily searched.

BRIEF DESCRIPTION OF THE DRAWINGS

The present invention will be better understood after reading the following detailed description of the presently preferred embodiments thereof with reference to the appended drawings, in which:

FIGS. 2A and 2B are tables of sample error codes; and

DETAILED DESCRIPTION

Figure 1:
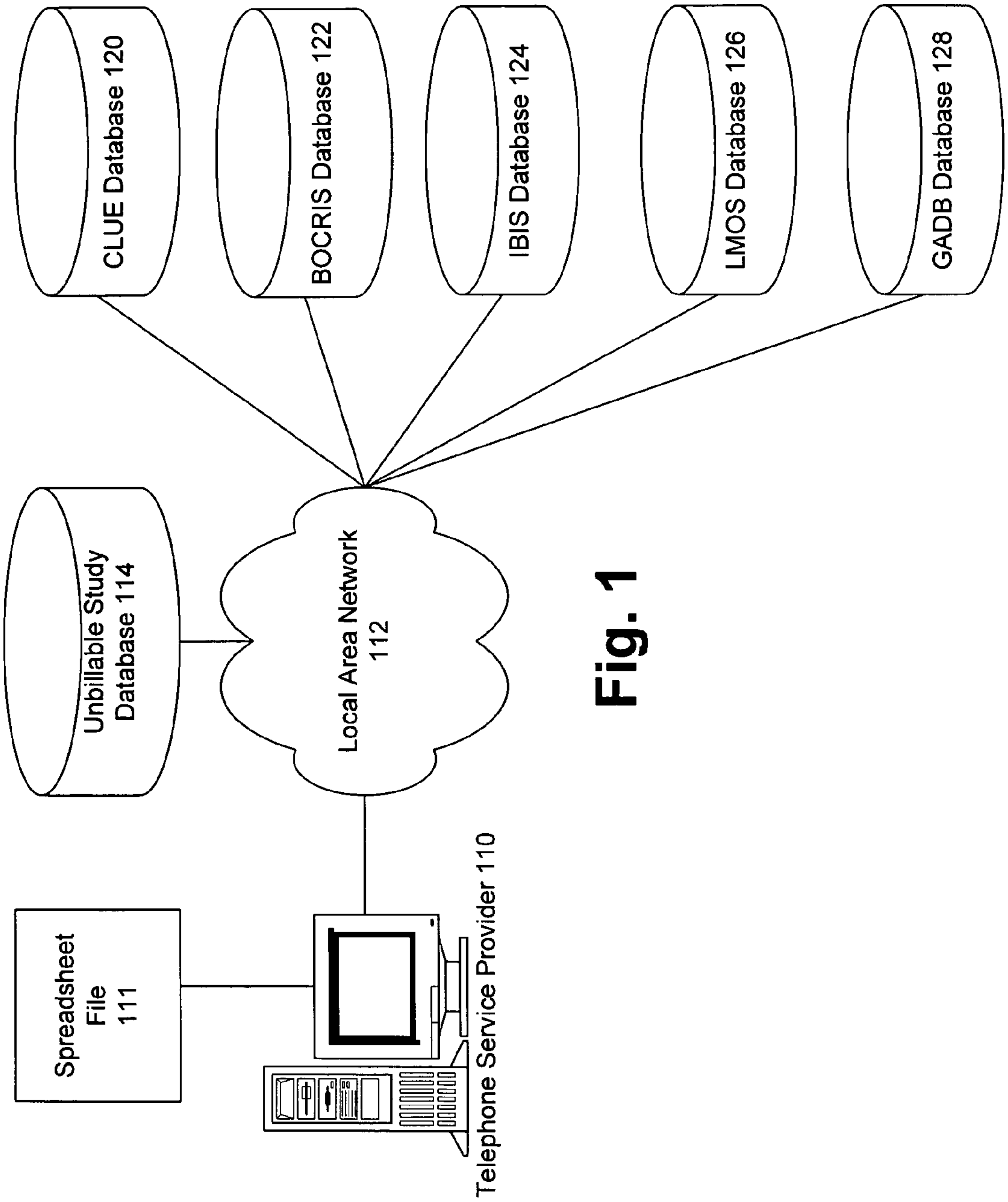
FIG. 1 illustrates a block diagram of a system for automating an unbillable study.

A system that meets the above-mentioned objects and provides other beneficial features in accordance with the presently preferred exemplary embodiment of the invention will be described below with reference to FIGS. 1-3. Those skilled in the art will readily appreciate that the description given herein with respect to those figures is for explanatory purposes only and is not intended in any way to limit the scope of the invention. Throughout the description, like reference numerals will refer to like elements in the respective figures.

Billing errors occur when customer billing logic, referred to as a "guide", fails to match an event to a customer bill. When an error occurs, a telephone service provider may be unable to bill a call to a customer. The telephone service provider may be an RBOC providing service over its local network, an IXC, or another third party providing service over a local network operated and maintained by an RBOC. To find records relating to the unbillable call, the telephone service provider may request a search of at least one unbillable study database 114 maintained by the RBOC. The RBOC conducts an investigation of the searched databases comprising all records relating to the unbillable call to determine which account should be billed. Referring now to FIG. 1, telephone service provider 110 stores account information corresponding to unbillable calls in an electronic file 111 such as, for example, a spreadsheet file. The Telephone service provider 110 provides the RBOC with unbillable records over local area network 112 such that the RBOC may search CLUE database 120, BOCRIS database 122, IBIS database 124, LMOS database 126, and GADB database 128 for records related to an unbillable call. The method for searching databases 120-128 will be discussed in detail below with reference to FIGS. 2-3.

Generally, the account information corresponding to an unbillable telephone call is stored by telephone service provider 110 in an electronic file 111 such as, for example, a spreadsheet file. Account information may comprise information such as, for example, the account number, the site code, and a code identifying the type of error. The error codes are shown in FIGS. 2A and 2B. The electronic file is populated by the telephone service provider when EMI records sent to the RBOC fail to generate billable events and result in errors. Data from the electronic file is imported into an unbillable study database 114 maintained by the RBOC. At least one RBOC database 120-128 is searched to retrieve records corresponding to the account information. A single report of the retrieved records from all of the searched databases is generated. The report may be either printed or viewed on a screen attached to a personal computer. The report may be stored in a query-able database, thereby enabling the report to be quickly and easily searched.

Figure 3:
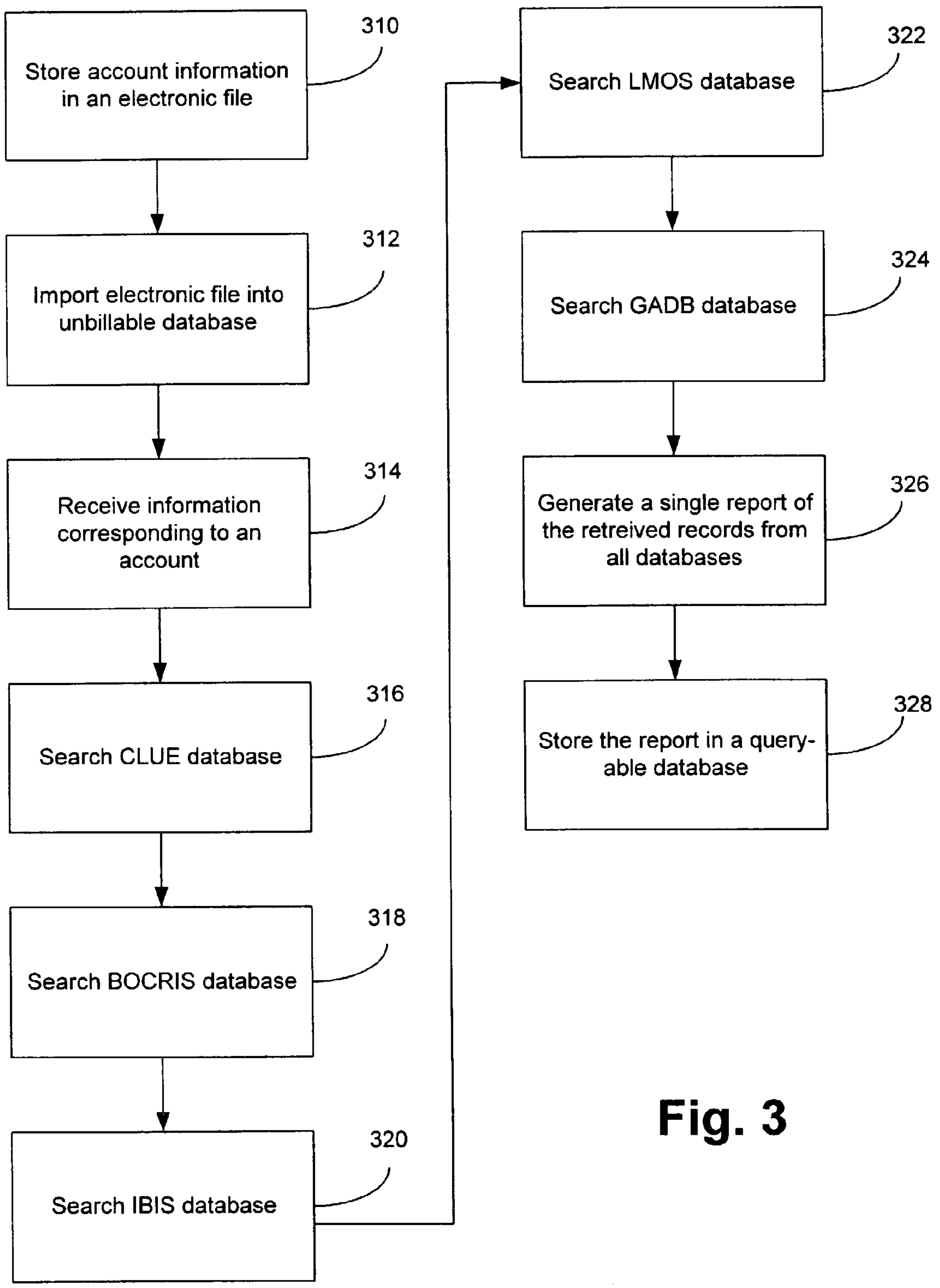
FIG. 3 illustrates a flowchart of a method for automating an unbillable study.

Referring now to FIG. 3, account information corresponding to an unbillable telephone call is stored by the telephone service provider in an electronic file such as, for example, a spreadsheet file at step 310. Account information may comprise information such as, for example, the account number, the site code, and a code identifying the type of error. Common billing errors include errors such as, for example, a date of call after disconnection of service, a call from an invalid state, an invalid carrier identification, and a toll message with an 800 service guide.

At step 312, data from the electronic file is transmitted to the RBOC and is imported into unbillable study database 114. At step 314, information corresponding to an account is received from unbillable study database 114. At step 316, a CLUE database is searched. The initial screens are navigated and relevant records are copied. A single report is populated with the relevant records. At step 318, a BOCRIS database is searched. The initial screens are navigated and relevant records are copied. A single report is populated with the relevant records. At step 320, an IBIS database is searched. The initial screens are navigated and relevant records are copied. A single report is populated with the relevant records. At step 322, an LMOS database is searched. The initial screens are navigated and relevant records are copied. A single report is populated with the relevant records. At step 324, GADB database is searched. The initial screens are navigated and relevant records are copied. A single report is populated with the relevant records. At step 326, the single report of the retrieved records from all of the searched databases is finalized. The report may be either printed and examined in hard copy or viewed on a screen attached to a personal computer. At step 328, the report is maintained in a query-able database, thereby enabling the report to be quickly and easily searched.

While the invention has been described and illustrated with reference to specific embodiments, those skilled in the art will recognize that modification and variations may be made without departing from the principles of the invention as described above and set forth in the following claims. For example, while the invention has been described as being used to search a CLUE database, a BOCRIS database, an IBIS database, an LMOS database, and a GADB database, the invention may be used to search any database comprising records related to an unbillable call. Furthermore, the telephone service provider may connect to the databases over any network such as, for example, the Internet. Accordingly, reference should be made to the appended claims as indicating the scope of the invention.

We claim:

1. A method of performing an electronic search for information about an unbillable call, the method comprising:

receiving account information corresponding to the unbillable call from an unbillable study database, the unbillable call being a call for which no billed rate can be charged due to an error with the call wherein said account information includes information from at least one of a correction online of usage errors investigation database, an online customer record for inquiry systems database, an interdepartmental bill investigative system database, a loop maintenance operating system database and a guide access database and further wherein said information includes a code identifying one of an invalid date of call, a call from an invalid state, an invalid carrier identification, and a toll message with an 800 service guide;

searching at least one database by navigating initial screens of said at least one database and retrieving records corresponding to the account information; and generating a report of the retrieved records to provide information associated with unbillable calls.

2. A method as in claim 1, wherein receiving account information comprises receiving at least one of an account number, a site code, and a code identifying a type of error.

3. A method as in claim 1, wherein receiving account information comprises receiving account information from the unbillable study database, the account information imported to the unbillable study database from a spreadsheet file provided by a telephone service provider.

4. A method as in claim 1, wherein generating a report comprises one of generating a printed report and generating a report that is viewable on a screen attached to a personal computer.

5. A method as in claim 1, further comprising storing the report in a query-able database.

6. A search engine for retrieving customer information corresponding to unbillable accounts, comprising:

a processor operative to execute computer executable instructions; and a memory having stored therein computer executable instructions for:

receiving account information corresponding to an unbillable call from an unbillable study database, the unbillable call being a call for which no billed rate can be charged due to an error with the call;

searching at least one database to retrieve records corresponding to the account information; and generating a report of the retrieved records to provide information associated with unbillable calls wherein said account information includes information from at least one of a correction online of usage errors investigation database, an online customer record for inquiry systems database, an interdepartmental bill investigative system database, a loop maintenance operating system database and a guide access database and further wherein said information includes a code identifying one of an invalid date of call, a call from an invalid state, an invalid carrier identification, and a toll message with an 800 service guide.

7. A search engine as in claim 6, wherein said computer executable instructions for receiving account information comprise computer executable instructions for receiving at least one of an account number, a site code, and a code identifying a type of error.

8. A search engine as in claim 6, wherein said computer executable instructions for receiving account information comprise computer executable instructions for receiving account information from the unbillable study database, the account information imported to the unbillable study database from a spreadsheet file provided by a telephone service provider.

9. A search engine as in claim 6, wherein said computer executable instructions for generating a report comprise computer executable instructions for one of generating a printed report and generating a report that is viewable on a screen attached to a personal computer.

10. A search engine as in claim 6, wherein said computer executable instructions further comprising computer executable instructions for storing the report in a query-able database.

11. A method of searching plural disparate database systems containing information related to unbillable telephone events comprising:

receiving a spreadsheet file containing data corresponding to an unbillable telephone call, the unbillable call being a call for which no billed rate can be charged due to an error with the call;

importing said spreadsheet file into an unbillable study database;

accessing the plural disparate database systems, including at least one of a correction online of usage errors investigation database, an online customer record for inquiry systems database, an interdepartmental bill investigative system database, a loop maintenance operating system database and a guide access database;

identifying information within the plural disparate database systems that corresponds to the unbillable telephone call, wherein said information includes a code identifying one of an invalid date of call, a call from an invalid state, an invalid carrier identification, and a toll message with an 800 service guide;

copying the identified information to a report to provide information associated with unbillable calls; and storing said report in a query-able database.

12. A method as in claim 11, wherein receiving a spreadsheet file comprises receiving a spreadsheet file comprising at least one of an account number, a site code, and a code identifying the type of error.

13. A method as in claim 11, wherein receiving a spreadsheet file comprises receiving a spreadsheet file provided by a telephone service provider.

14. A method as in claim 11, wherein copying information to a report comprises one of copying information to a printed report and copying to a report that is viewable on a screen attached to a personal computer.

15. A search engine for retrieving customer information corresponding to unbillable accounts, comprising:

a processor operative to execute computer executable instructions; and a memory having stored therein computer executable instructions for:

receiving account information corresponding to an unbillable call from an unbillable study database, the unbillable call being a call for which no billed rate can be charged due to an error with the call;

searching at least one database to retrieve records corresponding to the account information;

generating a report of the retrieved records to provide information associated with unbillable calls;

wherein said computer executable instructions for receiving account information comprise computer executable instructions for receiving at least one of an account number, a site code, and a code identifying a type of error; and wherein said computer executable instructions for receiving a code identifying a type of error comprise computer executable instructions for receiving a code identifying one of an invalid date of call, a call from an invalid state, an invalid carrier identification, and a toll message with an 800 service guide further wherein said account information includes information from at least one of a correction online of usage errors investigation database, an online customer record for inquiry systems database, an interdepartmental bill investigative system database, a loop maintenance operating system database and a guide access database.

* * * * *